(12) United States Patent  
Caldwell et al.

(10) Patent No.: US 6,195,688 B1  
(45) Date of Patent: Feb. 27, 2001

(54) COMPUTER SYSTEM, PROGRAM PRODUCT AND METHOD OF COMMUNICATING INTERNETWORKING DATA OVER A MASTER-SLAVE COMMUNICATION LINK

(75) Inventors: Joseph Alan Caldwell; Gary Alan Diehl, both of Endwell, NY (US); Arthur Joseph Meyer, III, Oronoco; Marion Alston Pitts, Rochester, both of MN (US); Charles William Price, II, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/074,269

(22) Filed: May 7, 1998

(51) Int. Cl.⁷ ...................................................... G06F 15/16
(52) U.S. Cl. ............................................................ 709/208
(58) Field of Search ................................... 709/208, 209, 709/210, 211; 712/31; 710/31

(56) References Cited

U.S. PATENT DOCUMENTS

| | | | |
|---|---|---|---|
| 5,517,622 | * 5/1996 | Ivanoff et al. | 395/200.13 |
| 5,781,550 | * 7/1998 | Templin et al. | 370/401 |
| 5,812,768 | * 9/1998 | Page et al. | 395/200.09 |
| 5,815,668 | * 9/1998 | Hashimoto | 709/238 |
| 5,889,777 | * 3/1999 | Miyao et al. | 370/345 |
| 5,968,129 | * 10/1999 | Dillon et al. | 709/233 |
| 5,970,066 | * 10/1999 | Lowry et al. | 370/353 |
| 6,005,869 | * 12/1999 | Sakai et al. | 370/452 |
| 6,014,383 | * 1/2000 | McCarty | 370/453 |

OTHER PUBLICATIONS

*Web Access Over SNA Redbook*, International Business Machines Corporation, No. SG24–2101, Chapters 1 & 2, (Jul. 1997).

* cited by examiner

Primary Examiner—Zarni Maung
Assistant Examiner—Nkosi Trim
(74) Attorney, Agent, or Firm—Wood, Herron & Evans, L.L.P.; Roy W. Truelson (57) ABSTRACT

A computer system, program product, and method of communicating internetworking data over a master-slave communication link utilize a device driver in a workstation coupled to a multi-drop master-slave communication link to forward internetwork datagrams to the network interface of the workstation in a format defined by an internetworking protocol in response to receipt thereof of data segments transmitted over the master-slave communication link that are encapsulated in a header native to the multi-drop master-slave communication link. A host computer coupled to the workstation over the multi-drop master-slave communication link maps the hardware address of the workstation to a network address consistent with the internetworking protocol, and initiates a communication session with the workstation using this mapped network address so that the network interface of the workstation can recognize the network address as its assigned address. Subsequently, data transmissions to the workstation from the host encapsulate an internetworking datagram that has as its destination the workstation within a header that is native to the protocol of the multi-drop master-slave communication link, and that specifies the hardware address of the workstation, so that the underlying link interface hardware and/or software can recognize the encapsulated data segment as destined for the workstation.

23 Claims, 6 Drawing Sheets

COMPUTER SYSTEM, PROGRAM PRODUCT AND METHOD OF COMMUNICATING INTERNETWORKING DATA OVER A MASTER-SLAVE COMMUNICATION LINK

FIELD OF THE INVENTION

The invention is generally related to computer networking, and in particular, to the transmission of data between computer systems coupled over a master-slave communication link.

BACKGROUND OF THE INVENTION

Master-slave computer systems have been utilized extensively in various corporate, government and academic environments, particularly in applications requiring advanced computing power. With a master-slave computer system, a relatively powerful host computer such as a mainframe computer, a midrange computer, or server computer, handles the majority of the computer operations, with a number of non-programmable, or "dumb", terminals interfaced with the host computer to do little more than receive input from users and output the results of operations performed by the host computer.

In a master-slave computer system, terminals are typically coupled to a host computer through a master-slave communication link, with the host computer acting as the master and the terminals acting as slaves. The host computer controls the flow of all information across the master-slave communication link, and all communications with any terminal typically pass through the host computer. One such master-slave communication link, for example, is the Twinax attachment interface from International Business Machines Corporation, which defines one cabling and low-level master-slave protocol suitable for use with host computers and the like. A transmission protocol such as the Twinax Data Link Control (TDLC) protocol developed by International Business Machines Corporation is often used on such interfaces to communicate data thereon. Moreover, typically the data is further encapsulated in a higher-level network architecture such as Systems Network Architecture (SNA), also developed by International Business Machines Corporation, for use in the master-slave environment.

While master-slave computer systems are still in widespread use, personal computers have to some extent supplanted such computer systems in a number of environments. Personal computers continue to increase in performance, and thus, are capable of handling many tasks that once required a powerful host computer—and often at a significantly lower cost.

In some environments, personal computers may be installed in addition to or in lieu of the non-programmable terminals in a master-slave computer system, typically using suitable master-slave interface hardware (e.g., an interface adapter card) and a terminal emulation computer program that in effect enables a personal computer to mimic a non-programmable terminal when communicating with a host computer. This permits, for example, the personal computers to be used for local operations, as well as for host-based operations such as creating and accessing shared folders on the host, transferring files with the host, initiating computer programs on the host, etc.

More typically, however, personal computers are coupled to one another and/or to a server computer over a local area network (LAN) and/or wide area network (WAN) interface, which permits individual computers coupled to the LAN and/or WAN to communicate directly with one another without the necessity of sending information through a host computer (as is required with a master-slave communication link). Data communicated in this manner is often referred to as "internetworking data", and an internetworking protocol is typically used to define the manner in which such data is transmitted over a LAN and/or WAN. Most internetworking protocols rely on network addresses to identify computers and other devices connected to a network. Using network addresses, operations such as "peer-to-peer" operations, where any computer coupled to a network can pass information to any other computer coupled to the network, and "broadcast" operations, where a single transmission may be routed to multiple computers in a group, may be supported.

One popular protocol for transmitting information in this manner is the Transmission Control Protocol/internet Protocol (TCP/IP), which permits computers in a network to be assigned unique network addresses commonly referred to as "IP addresses". Many of the most popular user applications rely heavily on TCP/IP communication. For example, much of the Internet is configured for TCP/IP-based communication, and thus, a number of popular applications such as web browsers, email clients, groupware applications, file transfer protocol (FTP) clients, etc., support the TCP/IP protocol. Many operating systems implement TCP/IP-compatible networking that provides a standard set of TCP/IP-based functions that may be used by an application executing on such systems so that the specific operations associated with handling TCP/IP communications are transparent to the applications.

Due to the fundamental differences between master-slave communication links and peer-to-peer enabled internetworking network interfaces, however, it may be difficult to support internetworking communication with personal computers coupled to a master-slave communication link. Most master-slave communication links are not addressable other than providing limited low-level hardware-based addressing, and peer-to-peer and broadcast operations initiated by the personal computers are often not supported due to the necessity for all communications to be funneled through the host computer.

Significant numbers of master-slave computer system installations exist throughout the world, and thus, the inability to communicate internetworking data over the master-slave communication links thereof often significantly limits the functionality of such installations. Short of scrapping a master-slave computer system and starting from scratch, one manner of resolving this problem is to install an additional LAN and/or WAN in a facility and couple the personal computers in the master-slave computer system to the additional network via additional hardware. However, installing an additional network can be a significant expense, principally due to hardware costs as well as the cost of installing additional wiring throughout a facility.

Given that the infrastructure for master-slave communication links is already in place for many existing master-slave computer systems, it would be much more cost effective to be able to communicate internetworking data over such links. Prior attempts to communicate internetworking data, however, utilize a dedicated gateway system coupled between a host computer and a LAN. The gateway system encapsulates data within a packet formatted using the transmission protocol of the host computer, then the host computer further encapsulates the packet using the transmission protocol of the master-slave communication link.

For example, for a Twinax attachment interface, a gateway system has been used between a LAN and a host computer such as an AS/400 midrange computer to encapsulate TCP/IP datagrams or packets within an SNA header for communication by the AS/400 computer. Then, a workstation controller in the AS/400 computer further encapsulates the data within a TDLC header for transmission over the Twinax interface.

Encapsulating internetworking data using the transmission protocol of the host computer, and then the transmission protocol of the underlying master-slave communication link, requires a dedicated gateway system that encompasses specific hardware and software. Moreover, each workstation requires a special device driver, as well as a special network interface. As a result, prior attempts at encapsulation often still involve significant additional hardware and software expense.

Therefore, a significant need continues to exist for a manner of communicating internetworking data over an existing master-slave communication link that requires minimal modifications with minimal additional expenses.

SUMMARY OF THE INVENTION

The invention addresses these and other problems associated with the prior art by providing a computer system, program product, and method of communicating internetworking data over a master-slave communication link in which a device driver in a workstation or other computer coupled to a multi-drop master-slave communication link is utilized to forward internetwork datagrams to the network interface of the workstation in a format defined by an internetworking protocol in response to receipt thereof of data segments transmitted over the master-slave communication link that are encapsulated in a header native to the multi-drop master-slave communication link.

Moreover, a host or other computer coupled to the workstation over the multi-drop master-slave communication link may be utilized to map the hardware address of the workstation to a network address consistent with the internetworking protocol, and to initiate a communication session with the workstation using this mapped network address so that the network interface of the workstation can recognize the network address as its assigned address. Subsequently, data transmissions to the workstation from the host may encapsulate an internetworking datagram that has as its destination the workstation within a header that is native to the protocol of the multi-drop master-slave communication link, and that specifies the hardware address of the workstation, so that the underlying link interface hardware and/or software can recognize the encapsulated data segment as destined for the workstation.

By incorporating this functionality into a device driver for the workstation, the communication of internetworking data over the multi-drop master-slave communication link may be transparent to both the network interface and the underlying link interface hardware and/or software for the multi-drop master-slave communication link. Consequently, no modification to the network interface or the underlying interface hardware and/or software is typically required, thereby substantially reducing the additional costs associated with implementing internetworking capabilities in a master-slave environment.

Therefore, consistent with one aspect of the invention, a method, program product and computer system are provided in which internetworking data is communicated from a first computer to a second computer over a multi-drop master-slave communication link, with the second computer includes a network interface defined by an internetworking protocol. A communication session is initiated between the first and second computers, with a hardware address for the second computer on the multi-drop master-slave communication link mapped to a network address in a format defined by the internetworking protocol. An encapsulated data segment is transmitted from the first computer to the second computer using the initiated communication session, with the encapsulated data segment generated from a first internetwork datagram that identifies the network address of the second computer by encapsulating the first internetwork datagram within a header native to the multi-drop master-slave communication link, with the header identifying the hardware address of the second computer. In a device driver in the second computer, the encapsulated data segment is received and a second internetwork datagram is forwarded to the network interface in the second computer, with the second internetwork datagram generated from the encapsulated data segment such that the second internetwork datagram is in a format defined by the internetworking protocol.

Consistent with another aspect of the invention, a method, program product and computer system are provided in which internetworking data transmitted by a first computer coupled to a second computer over a multi-drop master-slave communication link is received in the second computer, with the second computer including a hardware address on the multi-drop master-slave communication link and a network interface defined by an internetworking protocol. A network address transmitted by the first computer is received by the second computer, with the network address mapped to the hardware address for the second computer and in a format defined by the internetworking protocol. A device driver in the second computer receives an encapsulated data segment from the first computer, with the encapsulated data segment generated from a first internetwork datagram that identifies the network address of the second computer through encapsulation of the first internetwork datagram within a header native to the multi-drop master-slave communication link, and with the header identifying the hardware address of the second computer. A second internetwork datagram is forwarded to the network interface, with the second internetwork datagram generated from the encapsulated data segment such that the second internetwork datagram is in a format defined by the internetworking protocol.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware Environment

Figure 1:
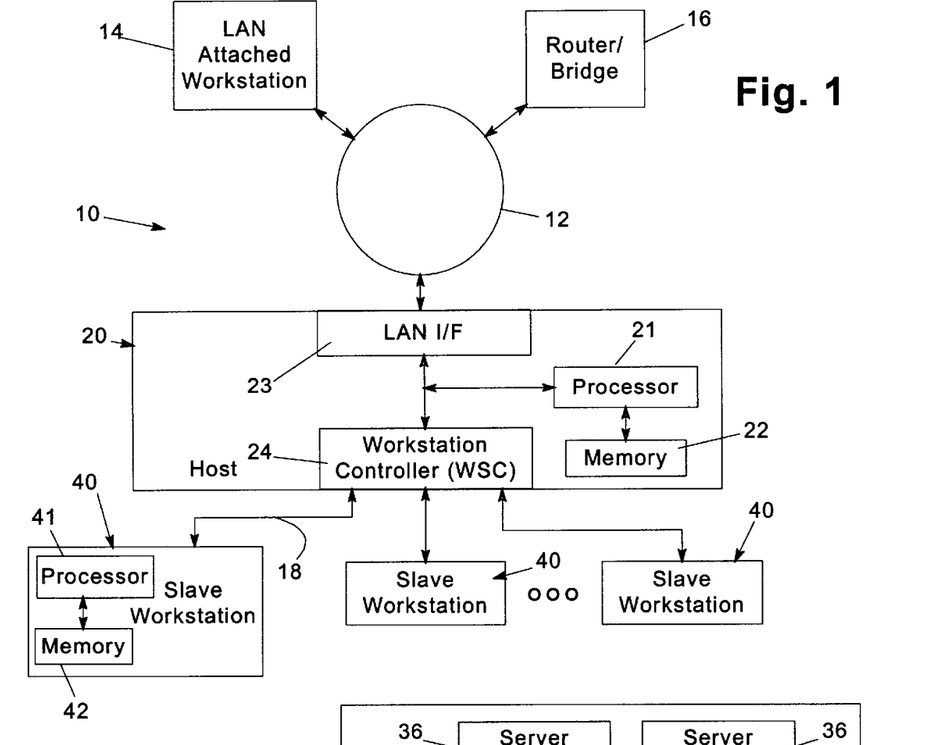
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is illustrated as a networked computer system including a local area network (LAN) 12 coupling together a plurality of networked devices, e.g., a LAN attached workstation 14, a router/bridge 16 and a host computer system 20.

LAN 12 may support various topologies, e.g., token ring or Ethernet, as well as various transmission protocols. Moreover, it should be appreciated that other networkable devices may be coupled to LAN 12, e.g., various workstations, printers, routers, servers, bridges, etc., as is well known in the art. LAN 12 is typically a packet-based network that typically utilizes an internetworking protocol such as TCP/IP or IPX (among others) to transmit packets, or datagrams, between devices coupled to the LAN. The discussion hereinafter will focus specifically on transmitting TCP/IP-compatible internetworking datagrams; however, it should be appreciated that any other internetworking protocol may be used in the alternative.

Host 20 is illustrated as interfacing with LAN 12 through a LAN interface 22 (e.g., a network interface card), as well as with a plurality of slave workstations 40 through a master-slave communication link 18 controlled by a workstation controller (WSC) 24. Host 20 and workstations 40 form a master-slave computer system interfaced with LAN 12. Consistent with the invention, host 20 is configured to establish communication sessions with slave workstations over this master-slave communication link for the purpose of permitting internetworking data (as well as master-slave data) to be transmitted therebetween over the communication link.

Host 20 is typically utilized in a server or host capacity, whereby the workstations coupled thereto rely in part on the host for data storage and/or task-based processes. Host 20 also provides, however, a gateway to LAN 12 for such workstations. While any number of host computer systems may be utilized to act as a master for a master-slave communication link, one particularly suitable system is the AS/400 midrange computer system available from International Business Machines Corporation.

Each slave workstation 40 may be any number of networkable computer systems, e.g., a personal computer, a UNIX workstation, a network computer, etc., for which it is desirable to provide internetworking capability through the master-slave communication link. Moreover, it should be appreciated that other slave devices (e.g., non-programmable, or "dumb" terminals) may also be interfaced with host 20 over master-slave communication link 18.

Master-slave communication link 18 is driven by workstation controller 24 of host 20 acting as the communication link master. Each workstation 40 in turn functions a slave on the communication link. In the illustrated embodiment, for example, the master-slave communication link is compatible with the Twinax attachment interface, whereby workstation controller 24 and slave workstations 40 each include compatible interface hardware, e.g., the IBM 5250 Express Adapter available from International Business Machines Corporation.

It should be appreciated that other hardware environments may be used in the alternative. For example, LAN 12 may further be coupled via a router or bridge to another network such as a wide area network (WAN), or to a public network such as the Internet. Furthermore, host 20 may be coupled directly to a WAN or to the Internet, in addition to or in lieu of being coupled to a LAN. In addition, other multi-drop master-slave communication links that support low-level hardware addressing may also be used in the alternative, e.g., an RS485 interface, an RS422 interface, and a general purpose interface bus (GPIB), among others.

As illustrated in FIG. 1, host 20 typically includes one or more processors 21 coupled to a memory 22. Likewise, each workstation 40 typically includes one or more processors 41 coupled to a memory 42. Each of host 20 and workstations 40 typically operates under the control of an operating system, and executes various computer software applications, programs, objects, modules, etc. Moreover, various applications, programs, objects, modules, etc. may also include components that execute on multiple computer systems, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
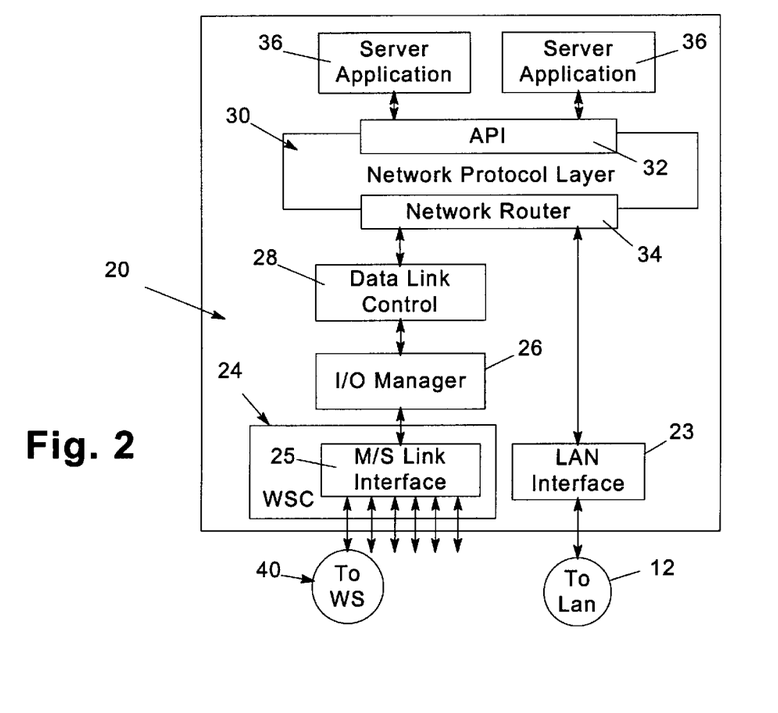
FIG. 2 is a block diagram of the primary components in the host of FIG. 1.

FIG. 2 illustrates one suitable software environment for host 20 consistent with the invention. Shown in host 20 are LAN interface 23 and workstation controller 24, as well as a number of software components, including master-slave (M/S) link interface 25, input/output (I/O) manager 26, data link control (DLC) 28, network protocol layer (NPL) 30, application programming interface (API) 32, network router 34, and server applications 36. M/S link interface 25 is resident in workstation controller 24, while components 26, 28, 30, 32, 34 and 36 are typically resident in and executed upon the primary processing components of host 20—namely processor 21 and memory 22 (shown in FIG. 1).

M/S link interface 25 in the illustrated embodiment utilizes the Twinax attachment protocol, and provides the low-level transmission and hardware addressing capabilities for transmitting information over the master-slave communication link. I/O manager 26 and data link control 28 together patch together network protocol layer 30 with the low level protocol of link interface 25. I/O manager 26 handles the dispatch and reception of packets with workstations 40, while DLC 28 provides data encapsulation relating to the length and type of data being transmitted over the master-slave communication link. DLC 28 in the illustrated embodiment utilizes the Twinax data link control protocol (TDLC), although other protocols may be used in the alternative.

Network protocol layer 30 establishes the network protocol and handles such functions as encapsulating data with a header that provides destination addressing, among other functions. Within layer 30 is defined an applications programming interface (API) 32 and a network router 34. API 32 provides network related functionality to support TCP/IP communications for various applications 36 executing on host 20. Network router 34 operates to funnel data to itself or to other devices on the network, in a manner well known in the art.

Figure 3:
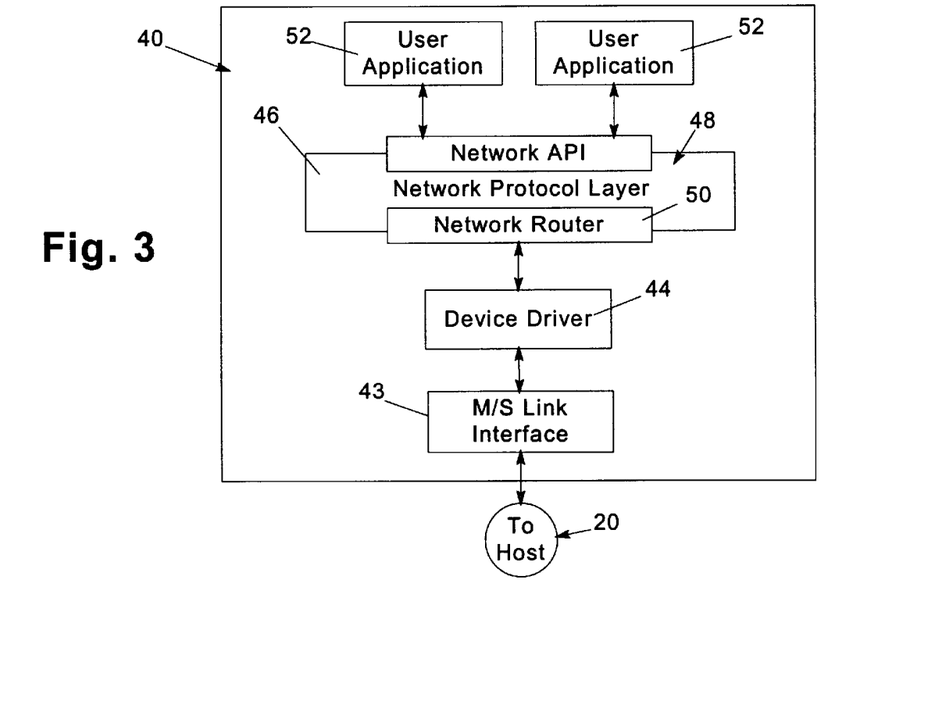
FIG. 3 is a block diagram of the primary components in the slave workstation of FIG. 1.

FIG. 3 illustrates one suitable software environment for a workstation 40 consistent with the invention. Shown in workstation 40 are a number of software components, including master-slave (M/S) link interface 43, device driver 44, network protocol layer 46, network application programming interface (API) 48, network router 50, and user applications 52. M/S link interface 43 is typically resident in the interface adapter card for the workstation, while components 44, 46, 48, 50 and 52 are typically resident in and executed upon the primary processing components of workstation 40—namely processor 41 and memory 42 (shown in FIG. 1).

As M/S link interface 25 of host 20 functions as the master for the master-slave communication link, M/S link interface 43 of workstation 40 serves as a slave on the same communication link to provide low-level transmission and hardware addressing capabilities for transmitting information over the master-slave communication link in accordance with the Twinax attachment protocol. Device driver 44 provides the software interface between interface 43 and network protocol layer 46. Network protocol layer 46 in turn includes network API 48, which provides network related functionality to support TCP/IP communications for various user applications 52 executing on workstation 40. Layer 46 also includes a network router 50 that operates to funnel data to itself or to other devices on the network, in a manner well known in the art.

Device driver 44 may utilize any number of device interfaces. For example, one suitable device interface is the network device interface specification (NDIS) developed by Microsoft Corporation and 3Com. With such an interface, driver 44 may define an NDIS "miniport" interfaced with network protocol layer 46 by an NDIS "wrapper", as is well known in the art. Other device interfaces may be used in the alternative.

As will become more apparent below, the ability to communicate internetworking data over a master-slave communication link may be principally implemented in host 20 within I/O manager 26 and data link control 28, and in workstations 40 solely within device driver 44. The other software components in host 20 and workstations 40, on the other hand, may not require any specific modification to implement this feature. This permits, for example, the network protocol layer services of a conventional operating system to be utilized, as well as conventional master-slave link interface services supplied in workstation controller 24 and the interface adapter cards in workstations 40. In addition, this permits any commercially-available server or workstation application that supports TCP/IP communication to communicate over the master-slave communication link without any specific modifications thereto. In effect, the master-slave communication link simply appears to such applications (and to the network protocol layer) as any other TCP/IP-compatible network port. For example, any number of conventional applications such as groupware applications, browser applications, file transfer protocol (FTP) applications, email applications, etc., which typically utilize TCP/IP communication, may be utilized without modification consistent with the invention.

From the end user's perspective, TCP/IP functionality for a workstation may therefore be obtained simply through installation of a new device driver, with no requirement for additional hardware or software modifications or upgrades. Among other advantages, this may permit a user to select a desired operating system (e.g., OS/2, Windows 95 or Windows NT, etc.) and/or network interface (e.g., TCP/IP, IPX, etc.) for use on the workstation based upon concerns other than the underlying master-slave communication link through which the workstation is coupled to a TCP/IP network.

It should be appreciated that different portions of any of the various software components may also be resident from time to time within different processors, caches, memories, external storage devices coupled to any of the devices in computer system 10, as is well known in the art. Other software environments may also be utilized in the alternative.

Communicating Internetworking Data over a Master-Slave Communication Link

Figure 4:
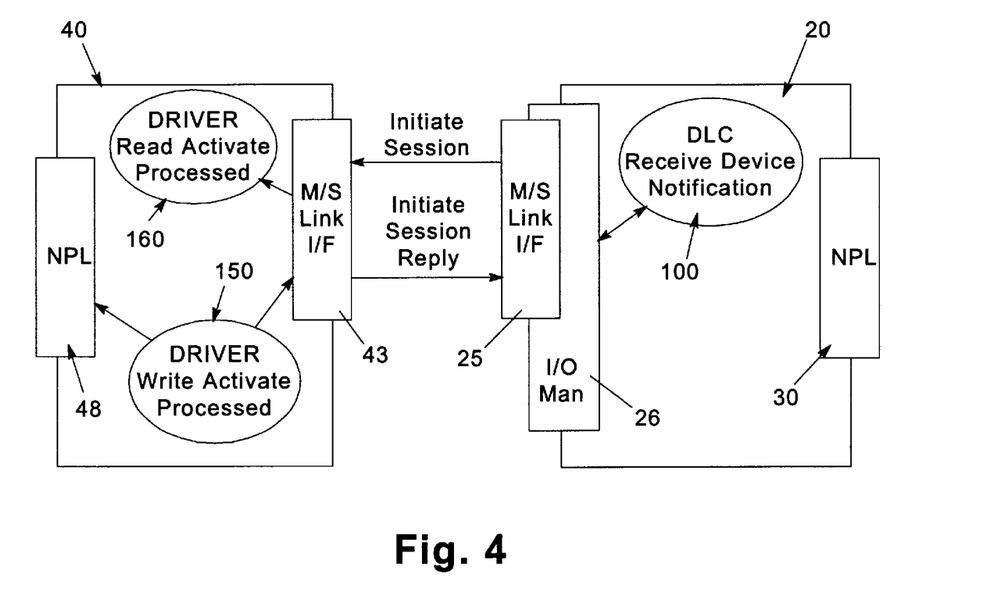
FIG. 4 is a block diagram illustrating the flow of data between the host and a slave workstation of FIG. 1 during an initiate session operation.

To communicate internetworking data over a master-slave communication link, a communication link between a host and a workstation must first be established. As shown in FIG. 4, for example, host 20 and workstation 40 may initiate a communication session therebetween by respectively passing "initiate session" and "initiate session reply" packets therebetween.

The initiation of a new communication session is typically performed in response to detection of a new device attached to the master-slave communication link by master-slave link interface 25 of the workstation controller in host 20. For example, for a Twinax interface, a conventional workstation controller periodically polls for devices attached to the communication link, in a manner well known in the art.

In response to detection of a new device, the data link control of host 20 is notified of the new device via master-slave link interface 25 and I/O manager 26, and in response executes a received device notification routine 100 to generate the initiate session packet via link interface 25 and I/O manager 26. Upon receipt of the initiate session packet by link interface 43 of workstation 40, a write activate processed routine 150 in the driver is executed to handle the initiate session packet. In turn, routine 150 calls a read activate processed routine 160 in the driver to send an initiate session reply packet back to the host.

Figure 5:
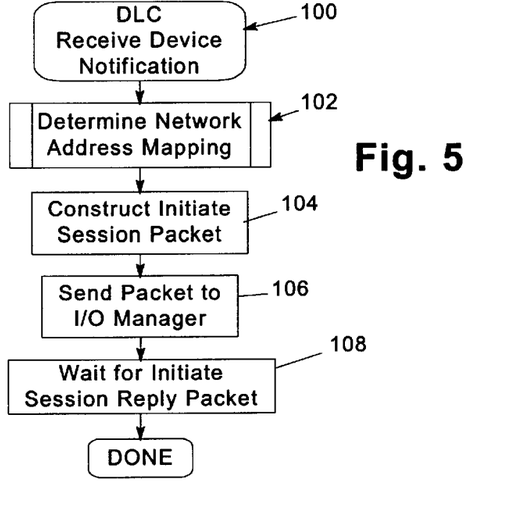
FIG. 5 is a flowchart illustrating the program flow of the receive device notification routine of FIG. 4.

Receive device notification routine 100 for the data link control layer is illustrated in greater detail in FIG. 5. Routine 100 begins by calling a determine network address mapping routine 102 to map the hardware address of the new device to a suitable IP address for the communication of TCP/IP datagrams. For example, for a Twinax interface, the hardware address may be a logical unit (LU) address based upon the system networking architecture (SNA) protocol utilized to communicate master-slave data over the master-slave communication link.

After a mapping for the new device is determined in routine 102, control passes to block 104 to construct an initiate session packet. The initiate session packet typically includes a workstation IP address and subnet mask, a workstation host name, (including a locally administered workstation hardware address), and the IP address of the DLC of the host. For example, one suitable format for the initiate session packet is illustrated in Table I below:

TABLE I

Initiate Session Packet Format

| Byte | Length | Description |
|---|---|---|
| 0 | 8 | TDLC Header (see Table IV) |
| 8 | 6 | Hardware Address assigned by Host |
| 14 | 4 | IP address associated with workstation |
| 18 | 4 | IP address associated with Host |
| 22 | 4 | Subnet mask |
| 26 | 2 | Length of workstation's Host Name |
| 28 | Var | Host Name of workstation |

The locally administered workstation hardware address may be generated in a number of manners. For example, one suitable address mapping is described below in Table II:

TABLE II

Hardware Address Bit Mapping

| Bit(s) | Description |
|---|---|
| 47 (MSB) | 1 = Group Address; 0 = Individual Address |
| 46 | 1 = Local Address; 0 = Universal Address |
| 45:26 | System Identifier (e.g., System S/N) |
| 25:6 | System Resource ID = WSC IOP type/model/serial |
| 5:0 | LU Address of workstation |

It should be appreciated that the hardware address for each workstation attached to the master-slave communication link must be unique for LAN interface requirements. Other mappings which may generate a unique address may be used in the alternative.

Once an initiate session packet is constructed in block 104, control passes to block 106 to send the packet to I/O manager 26 (FIG. 4), which then configures link interface 25 to generate the initiate session packet and pass the packet to workstation 40. Next, in block 108, the DLC waits for an initiate session reply packet back from the workstation, indicating that the communication link has been established. Upon receipt of such a packet, routine 100 is complete.

Figure 6:
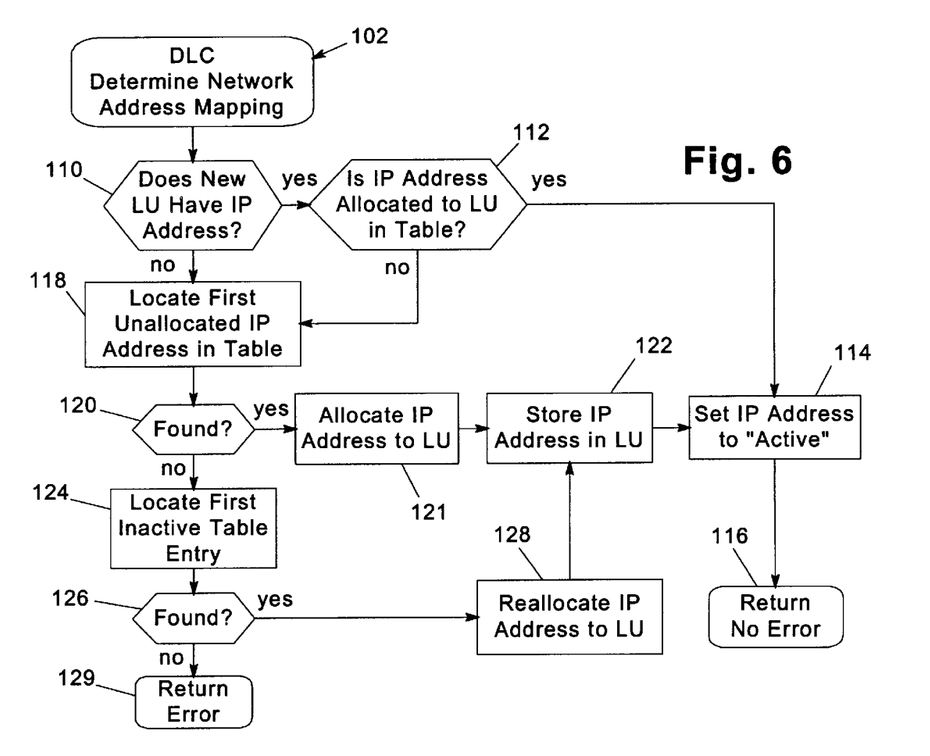
FIG. 6 is a flowchart illustrating the program flow of the determine network address mapping routine of FIG. 5.

Determine network address mapping routine 102 is illustrated in greater detail in FIG. 6. Generally, a pool of IP addresses are reserved by the DLC based upon its assigned internetworking address and subnet mask. For example, a pool of IP addresses for the master-slave communication link may be reserved as illustrated below in equations (1) and (2):

$$(\text{IP Address} \wedge \text{SubnetMask})+1 \qquad (1)$$

to $$(\text{IP Address} \wedge \text{SubnetMask})+\overline{\text{Subnet Mask}}-1 \qquad (2)$$

As one example, assuming a DLC IP address of 9.163.25.20, and a subnet mask of 255.255.255.128, the following pool of IP addresses may be reserved for the master-slave communication link:

$$(9.163.25.20 \wedge 255.255.255.128)+1=9.163.25.1 \qquad (3)$$

to $$(9.163.25.20 \wedge 255.255.255.128)+127-1=9.163.25.126 \qquad (4)$$

A logical unit (LU) address table is utilized within the DLC to maintain a mapping of IP addresses to workstations coupled to the master-slave communication link. The table typically includes an entry for each IP address in the pool, along with the LU of the mapped workstation (if allocated) and the current status of the communication session therebetween (active or inactive). For example, Table III below illustrates one suitable configuration of an address table consistent with the invention:

TABLE III

LU Address Table

| IP Address | LU | Status |
|---|---|---|
| 9.163.25.1 | LU1 | Active |
| 9.163.25.2 | LU7 | Inactive |
| 9.163.25.3 | LU3 | Active |
| * * * | * * * | * * * |
| 9.163.25.126 | LU5 | Active |

It should be appreciated that other table formats as well as other data structures may be utilized to map IP addresses to LU addresses, as well as to maintain such information for ready access by the DLC.

To determine the address mapping for a new device coupled to the master-slave communication link, routine 102 begins in block 110 by determining whether the new LU has an IP address associated therewith. The LU represents the permanent system object in host 20 corresponding to the workstation for which it is desired to initiate a session therewith. It should be appreciated that host 20 maintains a permanent system object for each logical unit capable of being coupled to the master-slave communication link. Consistent with the invention, within each object, an IP address entry is maintained therefor.

It may also be desirable to designate one or more specific device types for coupling TCP/IP-compatible devices to a master-slave communication link. For example, for the specific environment of a Twinax interface, additional device types may be added to represent a personal computer workstation and a network computer, e.g., specifying the devices respectively as 5150 Model 4 and Model 3 devices. Then, an "IP address" entry may be added only to the permanent system object for each LU that identifies itself as a 5150 Model 3 or 5150 Model 4. Thus, the DLC can determine whether a device attached to the Twinax interface is capable of operating with a TCP/IP communication session. Thus, other types of devices, e.g., non-programmable terminals, printers, and other non-TCP/IP devices, may also reside on the same communication link—and operate concurrently with workstations 40 without any modification thereto.

If the LU does have an IP address, control passes to block 112 to determine whether the IP address therefor is indicated to be allocated to the LU in the address table. If so, control passes to block 114 to set the entry for the IP address in the Address Table to "Active" to indicate that an active communication session has been established. Control then passes to block 116 to terminate the routine.

Returning to blocks 110 and 112, if the new LU does not have an IP address associated therewith, or if the IP address that is associated with the LU is not allocated to the LU in the Address Table, control instead passes to block 118 to attempt to locate the first unallocated IP address in the table. If such an unallocated IP address is found, block 120 then passes control to block 121 to allocate the IP address in the table to the LU. Next, block 122 stores the IP address in the permanent system object for the LU, and control then passes to blocks 114 and 116 to set the IP address to "Active" and terminate the routine.

Returning to block 120, if no unallocated IP address is found in the table, control passes to block 124 to attempt to locate the first inactive entry in the table. If such a table entry is found, block 126 passes control to block 128 to reallocate the IP address for the inactive table entry to the LU, and then to blocks 122, 114 and 116 to respectively store the IP address in the LU, set the IP address to "Active" and terminate the routine.

Returning to block 126, if no inactive table entry is found, control passes to block 129 to terminate the routine with an ERROR condition to indicate that no IP addresses are available, and thus, no communication session can be established.

Figure 7:
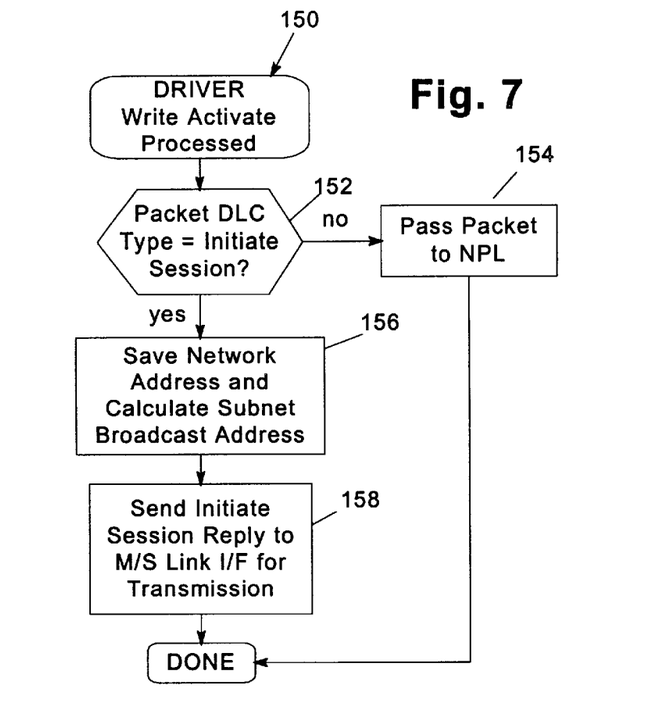
FIG. 7 is a flowchart illustrating the program flow of the write activate processed routine of FIG. 4.

Write activate processed routine 150 in the workstation driver is illustrated in greater detail in FIG. 7. This routine is called in response to receipt of any packet over the master-slave communication link. Routine 150 begins in block 152 by determining whether the packet DLC type is an initiate session packet. If not, the packet is merely passed to the network protocol layer in block 154, and routine 150 is complete. If, however, the packet is an initiate session packet, block 152 passes control to block 156 to save the network address (i.e., the IP address) and calculate a subnet broadcast address from the packet information. The subnet broadcast address is calculated, for example, using equation (5) below:

$$\text{Subnet Broadcast Address} = (\text{IP Address} \wedge \text{SubnetMask}) \vee \sim(\text{Subnet Mask}) \quad (5)$$

Next, in block 158, an initiate session reply packet is passed to the master-slave link interface 43 for transmission back to the host. Upon completion of block 158, routine 150 is complete.

It should be appreciated that the workstation may be configured to use dynamic host configuration protocol (DHCP or host assigned addressing) to formally request permission to use the addressing information in the initiate session packet. The driver may be configured to inspect the content of the DHCP discover packet to ensure that it contains the locally administered workstation hardware address and a request to use the IP address located in the initiate session packet. Any discrepancies may be corrected in the driver before the DHCP discover packet is released for transmission to the DLC interface and onto the DHCP servers in the network. It should be appreciated that the use of DHCP or host assigned addressing is generally well known in the art, and thus, need not be discussed further herein.

Figure 8:
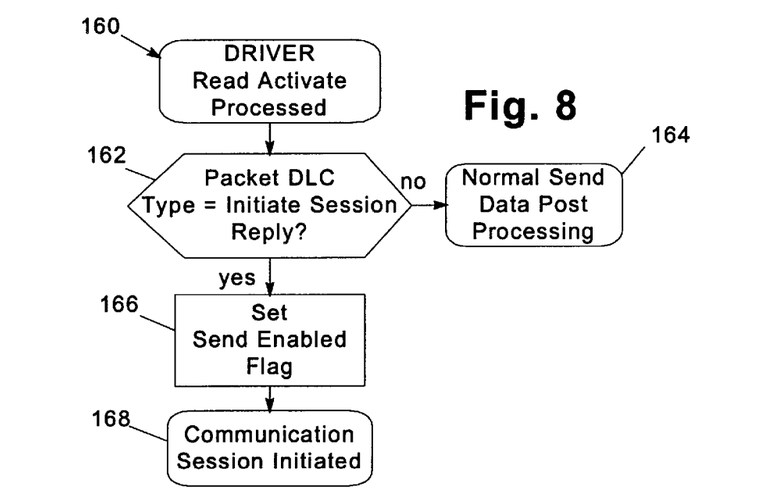
FIG. 8 is a flowchart illustrating the program flow of the read activate processed routine of FIG. 4.

FIG. 8 illustrates read activate process routine 160 in greater detail. Routine 160 is called upon completion of the transmission of the initiate session reply packet sent by write activate process routine 150. Routine 160 begins in block 162 by determining whether the DLC type of the packet is an initiate session reply. If not, control passes to block 164 to perform normal send data post processing, e.g., clearing buffers and registers as is known in the art.

Returning to block 162, however, if the packet is an initiate session reply packet, control passes to block 166 to set a "send enabled" flag to indicate that the communication session has been established, and that data may now be sent over the communication link by the workstation. Control then passes to block 168 to terminate the routine with the communication session initiated.

It should be appreciated that the manner of mapping IP addresses to LU addresses described herein incorporates a reasonable tradeoff between "near-static" IP addressing and the often burdensome requirement to reserve large IP address blocks for casual use. Other manners of mapping IP address to LU addresses will be apparent to one of ordinary skill in the art.

Figure 9:
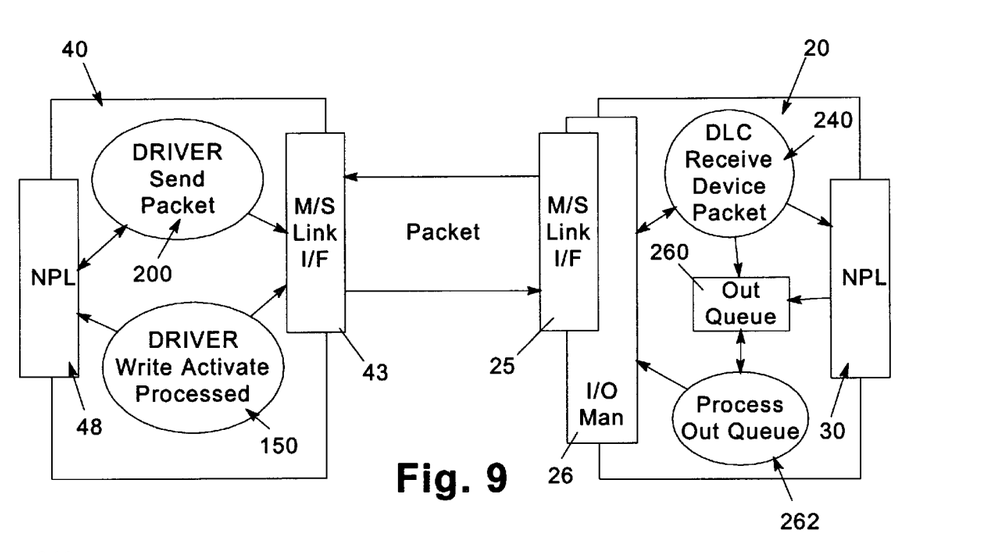
FIG. 9 is a block diagram illustrating the flow of data between the host and a slave workstation of FIG. 1 during a send packet operation.

FIG. 9 illustrates the exchange of a packet of information over an established TCP/IP communication session on the master-slave communication link. Transmission of a packet from workstation 40 to host 20, for example, is initiated via a user application attempting to pass the packet to the network protocol layer 48 of workstation 40. In response to this request, a send packet routine 200 in the driver is executed to pass the packet to link interface 43 of workstation 40. The packet is then transmitted over the master-slave communication link to link interface 25, where a receive device packet routine 240 in the DLC of host 20 is executed in response to receipt of the packet via link interface 25 and I/O manager 26. Routine 240 is capable of passing a packet directly to the network protocol layer 30 of host 20. In addition, routine 240 may also pass packets for broadcast directly in an out queue 260 that is handled by a process out queue routine 262.

Transmission of a packet from host 20 to workstation 40 also utilizes out queue que 260 via network protocol layer 30 of host 20. It should be appreciated that the use of an out queue to store packets for transmission to individual workstations coupled to the host is well known in the art.

Figure 10:
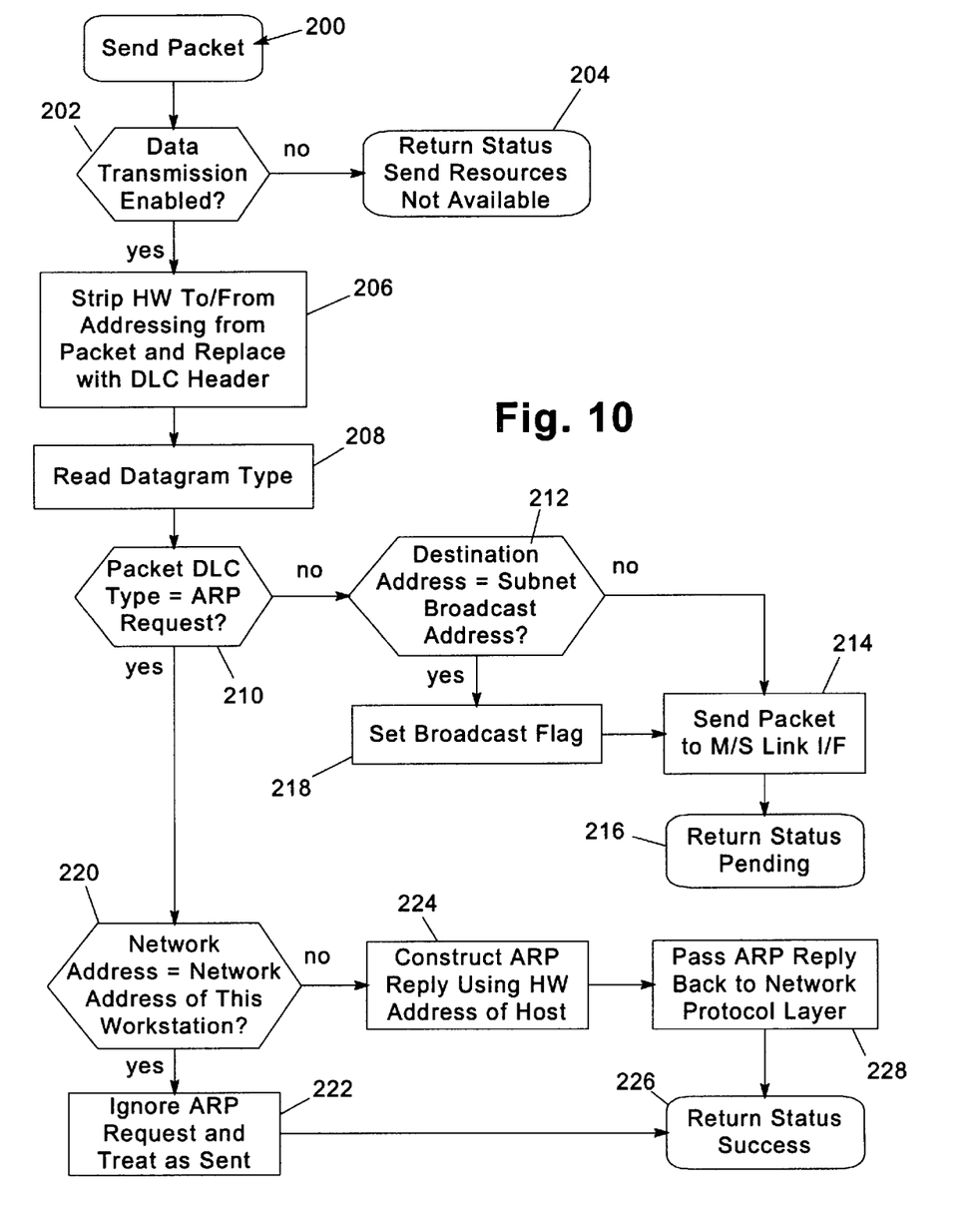
FIG. 10 is a flowchart illustrating the program flow of the send packet routine of FIG. 9.

Send packet routine 200 is illustrated in greater detail in FIG. 10. As discussed above, routine 200 is called by the network protocol layer 48 of workstation 40 in response to a request to send a packet over the master-slave communication link.

Routine 200 begins in block 202 by determining whether data transmission is enabled, based upon analysis of the "send enabled" flag set in read activate processed routine 160 (FIG. 8). If data transmission has not been enabled, control passes to block 204 to terminate with a status of "send resources not available", indicating to the network protocol layer that data transmission is not permitted.

If, however, data transmission is enabled, block 202 passes control to block 206 to strip the hardware to/from addressing from the packet to be sent and replace the addressing with the DLC header. The hardware to/from addressing, for example, is defined within a header such as a media access control (MAC) header, since the network protocol layer operates as if attached to a local area network. The DLC header, on the other hand, may be compatible with any master-slave link header, e.g., a TDLC compatible header.

Next, in block 208, the datagram type for the packet is analyzed, e.g., by reading the contents of the SNAP type field from the MAC header consistent with the IEEE 802.2 protocol.

Next, based upon the type of data being sent over the master-slave communication link, one of three primary program flows are initiated.

First, in the case of a standard transmission of a packet to a single IP address that is not the subnet broadcast address for the master-slave communication link, control passes through blocks 210, 212, 214 and 216 to send the packet to the host. Block 210 determines whether the packet DLC type is for an address resolution protocol (ARP) request. Block 212 determines whether the destination address specified in the packet is equal to the subnet broadcast address for the master-slave communication link. Block 214 passes the packet to be transmitted to the master-slave link interface 43 of workstation 40 so that the packet is sent to the host. Block 216 terminates routine 200 with an indication that the status of the transmission is "pending".

The second program flow is initiated for a packet that specifies as its destination address the subnet broadcast address for the master-slave communication link. The subnet broadcast address is typically assigned to allow packets to be sent simultaneously to all other devices on the same subnet, and is generated as described above with reference to equation (5).

If so, special handling must be performed by the host to "turn around" the packet for retransmission to the other workstations coupled to the host on the same master-slave communication link. Control therefore follows the program flow of blocks 210, 212, 218, 214 and 216 to handle transmission of the packet. In block 218, a "broadcast" flag in the packet is set prior to transmitting the packet to link interface 43 so that the host will recognize the packet as a request to broadcast to the other workstations in the subnet.

A third primary program flow is initiated in response to transmission of an ARP request packet. As is well known in the art, an ARP request is a request to find the hardware address of a destination device on a LAN prior to the actual transmission of data to the destination device. So that conventional TCP/IP routines in the network protocol layer of workstation 40 may be utilized without modification, a manner of "spoofing" ARP requests from the network protocol layer is implemented in the driver to mediate between the LAN interface and the master-slave communication link, since the master-slave communication link has no hardware, or MAC addressing. The effect of ARP spoofing is to reduce the transmission bandwidth and queued packet latency from that which would result if the ARP requests were transmitted as normal.

An ARP request contains the IP address of the destination device, and constitutes a request for a response from the correct device having such an address. Moreover, a network protocol layer may also issue an ARP request with its own IP address to determine if a conflict exists on the network, e.g., with another device on the network having the same IP address. Thus, such a request may be periodically issued by the network protocol layer to verify that no other devices are attached to the network with the same IP address. As a result, no response is expected from such a request, and if such a response is received, an ERROR is typically thrown from the network protocol layer.

In response to receipt of an ARP request packet, block 210 will therefore pass control to block 220 to determine whether the network address specified in the packet is the network address of the workstation. If so, the ARP request is intended to determine whether a conflict exists on the network. However, given the dynamic mapping process utilized to assign IP addresses to workstations coupled to the master-slave communication link, no conflict is possible, and thus, control passes to block 222 to ignore the ARP request and treat the packet as sent, (i.e., so the packet is not actually sent). This ensures that the network protocol layer does not receive a response to the ARP request, and will not signal an error due to any perceived conflict on the network. Upon completion of block 222, control passes to block 224 to return a "Success" status and terminate routine 200.

Returning to block 220, if the network address specified in the packet is not that of the workstation, control passes to block 226 to construct an ARP reply packet using the hardware address of the host as the hardware address of the destination requested in the ARP request. It should be appreciated that, since all data must be processed through the host in the master-slave communication link, an ARP request is not required. Thus, practically any hardware address (other than the workstation address) may be returned since the destination address is stripped from the packet in the first place and never used in communicating the packet over the master-slave communication link.

After the ARP reply packet is constructed in block 226, control passes to block 228 to pass the ARP reply packet to the network protocol layer to simulate receipt of a packet over a network as expected by the network protocol layer. A "Success" status is then returned in block 224, and routine 200 is complete. The effect of passing the ARP reply back to the network protocol layer is to cause the network protocol layer to release the packets to be transmitted, in a manner well known in the art.

It should be appreciated that the above-described configuration is suitable for use in the case where the DLC is configured as a subnet of the attached LAN. However, if the DLC is configured as a distinct network, the router information protocol (RIP) is enabled at the LAN interface so that packets will be routed to the LAN interface and through the IP router to the DLC interface for delivery to workstations coupled over the master-slave communication link.

Figure 11:
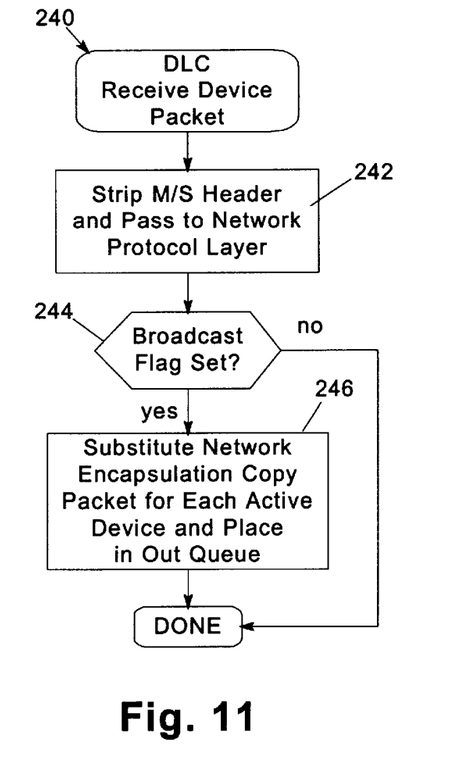
FIG. 11 is a flowchart illustrating the program flow of the receive device packet routine of FIG. 9.

FIG. 11 illustrates receive device packet routine 240 of the DLC of host 20. For each packet received by the DLC, the master-slave (TDLC) header information is stripped from the packet and the packet is then passed to the network protocol layer 30 of host 20 for processing in a manner well known in the art in block 242. Next, block 244 determines whether the broadcast flag in the header is set (which occurs if the destination address for the packet is equal to the subnet broadcast address, via block 218 of FIG. 10). If the flag is not set, routine 240 terminates. If, however, the broadcast flag is set, a network encapsulation copy packet is substituted for each active device and placed in the out queue for retransmission to each workstation on the subnet. Routine 240 is then complete.

Returning to FIG. 9, as discussed above, out queue 260 is utilized to store packets for transmission over the master-slave communication link. Out queue 260 may be fed via network protocol layer 30 in a manner well known in the art. In addition, packets may be passed by receive device packet routine 240 as discussed above when a subnet broadcast packet is received.

Figure 12:
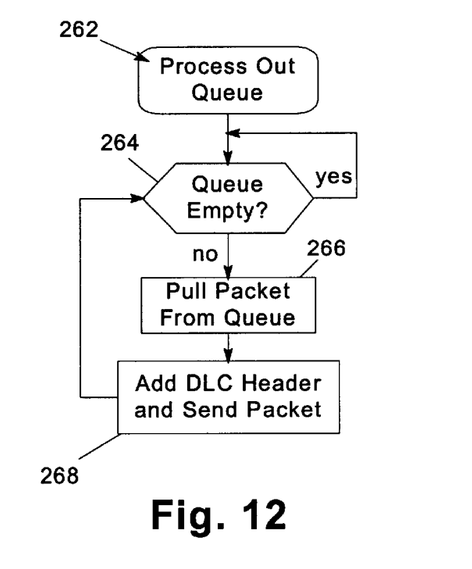
FIG. 12 is a flowchart illustrating the program flow of the process out queue routine of FIG. 9.

Packets are transmitted from the out queue to I/O manager 26 in an orderly fashion by a process out queue routine 260, which is illustrated in greater detail in FIG. 12. Routine 262 executes as a continuous thread that waits for the receipt of a packet in block 264 and continuously loops as long as the queue remains empty. If a packet is placed in the queue, control passes to block 266 to retrieve the packet from the queue, and then to block 268 to add the DLC header to the packet and pass the packet to I/O manager 26 for transmission over the master-slave communication link.

For a Twinax interface, the DLC header conforms to the Twinax TDLC protocol, and specifies the particular hardware address of the intended device. For example, one suitable TDLC-compatible header is illustrated below in Table IV:

TABLE IV

TDLC Header Format

| Byte | Length | Description |
| --- | --- | --- |
| 0 | 2 | Length of Data Transfer Buffer (Length of Date + Header) |
| 2 | 1 | Flag Byte:<br>x00 - Normal Data<br>x01 - Broadcast Data (Inbound)<br>x02 - Bundled Normal Data (Inbound)<br>x20 - Terminate Link Command<br>x40 - Initiate Link Command (SNA)<br>x41 - TCP/IP Initiate Session Command |
| 3 | 1 | x00 - Reserved |
| 4 | 4 | LLC Protocol Data Unit (LPDU) |

A number of unique advantages are realized by the above-described configuration. The configuration works with standard TCP/IP workstations without the added overhead and complexity that is typically present with conventional designs—specifically those that involve special network interface software in each workstation and a dedicated machine performing a gateway function. With above-described configuration, there are no additional requirements for a workstation as compared to an equivalent LAN-based solution. The configuration works with standard internetworking software provided with the workstation's operating system, and typically requires nothing other than a new device driver to be installed into the workstation's environment.

The specific software and hardware necessary to transmit TCP/IP over the master-slave communication link is more or less transparent to the user application utilizing such services, not to mention the underlying link interface hardware and software. To the network interface, the master-slave communication link appears to be a TCP/IP-compatible port, while to the link interface for the master-slave communication link, the device driver appears to be TDLC-compatible. Moreover, all of the functionality of a TCP/IP-compatible port is duplicated in the device driver (and also the host computer), including functions such as peer-to-peer and broadcast transmissions, as well as ARP functionality, such that the device driver appears no different than a conventional TCP/IP port to the network interface.

Various modifications may be made to the embodiments described herein without departing from the spirit and scope of the invention. For example, the invention may have utility with other master-slave communication link hardware and/or software protocols, as well as with different internetworking protocols. Other modifications will be apparent to one of ordinary skill in the art. Therefore, the invention lies in the claims hereinafter appended.

What is claimed is:

1. A method of communicating internetworking data from a first computer to a second computer over a multi-drop master-slave communication link, wherein the second computer includes a network interface defined by an internetworking protocol, the method comprising:

(a) initiating a communication session between the first and second computers, wherein said first computer is a host computer controlling said multi-drop master-slave communication link and communicating with a plurality of terminal computers attached to said multi-drop master-slave link using a respective hardware address associated with each terminal computer connected to said multi-drop master-slave communication link, and wherein said second computer is one of said plurality of terminal computers connected to said multi-drop master-slave communication link, said initiating step including mapping the hardware address for the second computer on the multi-drop master-slave communication link to a network address in a format defined by the internetworking protocol;

(b) transmitting an encapsulated data segment from the first computer to the second computer using the initiated communication session, including generating the encapsulated data segment from a first internetwork datagram that identifies the network address of the second computer by encapsulating the first internetwork datagram within a header native to the multi-drop master-slave communication link, the header identifying the hardware address of the second computer; and (c) in a device driver in the second computer, receiving the encapsulated data segment and forwarding to the network interface in the second computer a second internetwork datagram, including generating the second internetwork datagram from the encapsulated data segment such that the second internetwork datagram is in a format defined by the internetworking protocol.

2. The method of claim 1, wherein mapping the hardware address to a networking address includes:

(a) accessing an address table to locate a table entry for an unallocated network address from a pool of reserved network addresses stored in the address table; and (b) storing the hardware address of the second computer in the table entry for the unallocated network address.

3. The method of claim 2, wherein mapping the hardware address to a networking address further includes indicating in each table entry whether a communication session is active for the network address associated therewith, wherein storing the hardware address of the second computer in the table entry further includes indicating an active communication session for the table entry for the unallocated network address, and wherein accessing the address table further includes accessing the address table to locate a table entry for an allocated network address that indicates that no communication session is active for the network address associated therewith if no table entry for an unallocated network address is found.

4. The method of claim 2, wherein initiating the communication session includes transmitting an initiate session packet to the second computer over the communication link, the initiate session packet identifying the network address mapped to the second computer.

5. The method of claim 4, wherein initiating the communication session further includes calculating a locally-administered hardware address for the second computer, and wherein the initiate session packet further includes the locally-administered hardware address.

6. The method of claim 1, wherein generating the encapsulated data segment includes stripping hardware to/from addressing information from the first internetwork datagram prior to encapsulating the first internetwork datagram within the header.

7. The method of claim 1, wherein generating the second internetwork datagram includes stripping the header from the encapsulated data segment.

8. The method of claim 1, further comprising:
(a) in the device driver of the second computer, transmitting a second encapsulated data segment from the second computer to the first computer using the initiated communication session, including generating a second encapsulated data segment from a third internetwork datagram received from the network interface of the second computer by encapsulating the third internetwork datagram within a header native to the multi-drop master-slave communication link; and
(b) receiving the second encapsulated data segment in the first computer and generating therefrom a fourth internetwork datagram formatted in a format defined by the internetworking protocol.

9. The method of claim 8, wherein the third internetwork datagram identifies a network address of a third computer, and wherein receiving the second encapsulated data segment in the first computer further includes forwarding the fourth internetwork datagram to the third computer.

10. The method of claim 8, wherein the third internetwork datagram identifies a broadcast network address that directs the third internetwork datagram to at least one additional computer coupled to the communication link, wherein generating the second encapsulated data segment further includes setting a broadcast flag in the second encapsulated data segment, and wherein receiving the second encapsulated data segment further includes, in response to detection of the broadcast flag being set in the second encapsulated data segment, generating a third encapsulated data segment for transmission to the additional computer coupled to the communication link.

11. The method of claim 1, further comprising, in the device driver of the second computer, forwarding an address resolution protocol (ARP) reply to the network interface of the second computer without forwarding the reply to the first computer in response to receipt of an ARP request from the network interface of the second computer.

12. The method of claim 11, wherein the ARP request specifies a network address other than that mapped to the second computer, and wherein forwarding the ARP reply to the network interface includes generating in the ARP reply a fictitious hardware address.

13. The method of claim 1, further comprising, in the device driver of the second computer, ignoring an ARP request from the network interface of the second computer that specifies the network address mapped to the second computer.

14. The method of claim 1, wherein the network interface is configured to communicate via a Transmission Control Protocol/Internet Protocol (TCP/IP) protocol, wherein the first and second internetwork datagrams are formatted in a format defined by the TCP/IP protocol, wherein the network address includes an Internet Protocol (IP) address, wherein the master-slave communication link is a Twinax interface, wherein the header of the encapsulated data segment is formatted in a format defined by the Twinax Data Link Control (TDLC) protocol, and wherein the hardware address is a logical unit (LU) address for the master-slave communication link.

15. A method of receiving internetworking data in a second computer, the internetworking data communicated by a first computer coupled to the second computer over a multi-drop master-slave communication link, wherein the second computer includes a network interface defined by an internetworking protocol, the method comprising:

(a) receiving a network address transmitted by the first computer, wherein said first computer is a host computer controlling said multi-drop master-slave communication link and communicating with a plurality of terminal computers attached to said multi-drop master-slave link using a respective hardware address associated with each terminal computer connected to said multi-drop master-slave communication link, and wherein said second computer is one of said plurality of terminal computers connected to said multi-drop master-slave communication link, the network address being mapped to the hardware address for the second computer, the network address in a format defined by the internetworking protocol;

(b) receiving in a device driver in the second computer an encapsulated data segment from the first computer, the encapsulated data segment generated from a first internetwork datagram that identifies the network address of the second computer through encapsulation of the first internetwork datagram within a header native to the multi-drop master-slave communication link, the header identifying the hardware address of the second computer; and (c) forwarding to the network interface a second internetwork datagram, including generating the second internetwork datagram from the encapsulated data segment such that the second internetwork datagram is in a format defined by the internetworking protocol.

16. A computer system, comprising:

(a) a first computer and a second computer coupled to one another over a multi-drop master-slave communication link, wherein said first computer is a host computer controlling said multi-drop master-slave communication link and communicating with a plurality of terminal computers attached to said multi-drop master-slave link using a respective hardware address associated with each terminal computer connected to said multi-drop master-slave communication link, and wherein said second computer is one of said plurality of terminal computers connected to said multi-drop master-slave communication link;

(b) a first processor in the first computer, the first processor configured to initiate a communication session between the first and second computers with the hardware address for the second computer on the multi-drop master-slave communication link mapped to a network address in a format defined by an internetworking protocol, the first processor further configured to transmit an encapsulated data segment from the first computer to the second computer using the initiated communication session with the encapsulated data segment generated from a first internetwork datagram that identifies the network address of the second computer with the first internetwork datagram encapsulated within a header native to the multi-drop master-slave communication link, the header identifying the hardware address of the second computer; and (c) a second processor in the second computer, the second processor configured to execute a device driver and a network interface, the device driver configured to receive the encapsulated data segment and forward the a network interface a second internetwork datagram that is generated from the encapsulated data segment with the second internetwork datagram in a format defined by the internetworking protocol.

17. A workstation configured to be coupled to a host computer over a multi-drop master-slave communication link, the workstation comprising:

(a) a master-slave link interface coupled to the multi-drop master-slave communication link for communicating with said host computer, wherein said master-slave link interface in said workstation is configured to be one of a plurality of master-slave link interfaces in respective workstations attached to said multi-drop master-slave communication link, each workstation being identified on said master-slave communication link by a respective hardware address;

(b) a network interface defined by an internetworking protocol; and (c) a device driver configured to receive a network address transmitted by the host computer, the network address mapped to the hardware address for the workstation on the multi-drop master-slave communication link, and the network address in a format defined by the internetworking protocol; to receive an encapsulated data segment from the host computer, the encapsulated data segment generated from a first internetwork datagram that identifies the network address of the workstation through encapsulation of the first internetwork datagram within a header native to the multi-drop master-slave communication link, the header identifying the hardware address of the workstation; and to forward to the network interface a second internetwork datagram that is generated from the encapsulated data segment with the second internetwork datagram in a format defined by the internetworking protocol.

18. A program product, comprising:

(a) a program configured to perform a method of communicating internetworking data from a first computer to a second computer over a multi-drop master-slave communication link, wherein the second computer includes a network interface defined by an internetworking protocol, the method comprising:

(1) initiating a communication session between the first and second computers, wherein said first computer is a host computer controlling said multi-drop master-slave communication link and communicating with a plurality of terminal computers attached to said multi-drop master-slave link using a respective hardware address associated with each terminal computer connected to said multi-drop master-slave communication link, and wherein said second computer is one of said plurality of terminal computers connected to said multi-drop master-slave communication link, said initiating step including mapping the hardware address for the second computer on the multi-drop master-slave communication link to a network address in a format defined by the internetworking protocol;

(2) transmitting an encapsulated data segment from the first computer to the second computer using the initiated communication session, including generating the encapsulated data segment from a first internetwork datagram that identifies the network address of the second computer by encapsulating the first internetwork datagram within a header native to the multi-drop master-slave communication link, the header identifying the hardware address of the second computer; and (3) in a device driver in the second computer, receiving the encapsulated data segment and forwarding to the network interface in the second computer a second internetwork datagram, including generating the second internetwork datagram from the encapsulated data segment such that the second internetwork datagram is in a format defined by the internetworking protocol; and (b) a computer readable signal bearing media bearing the program.

19. The program product of claim 18, wherein the signal bearing media is transmission type media.

20. The program product of claim 18, wherein the signal bearing media is recordable media.

21. A program product, comprising:

(a) a device driver program configured to perform a method of receiving internetworking data in a second computer, the internetworking data communicated by a first computer coupled to the second computer over a multi-drop master-slave communication link, wherein the second computer includes a network interface defined by an internetworking protocol, the method comprising:

(1) receiving a network address transmitted by the first computer, wherein said first computer is a host computer controlling said multi-drop master-slave communication link and communicating with a plurality of terminal computers attached to said multi-drop master-slave link using a respective hardware address associated with each terminal computer connected to said multi-drop master-slave communication link, and wherein said second computer is one of said plurality of terminal computers connected to said multi-drop master-slave communication link, the network address being mapped to the hardware address for the second computer, the network address in a format defined by the internetworking protocol;

(2) receiving an encapsulated data segment from the first computer, the encapsulated data segment generated from a first internetwork datagram that identifies the network address of the second computer through encapsulation of the first internetwork datagram within a header native to the multi-drop master-slave communication link, the header identifying the hardware address of the second computer; and (3) forwarding to the network interface a second internetwork datagram, including generating the second internetwork datagram from the encapsulated data segment such that the second internetwork datagram is in a format defined by the internetworking protocol; and (b) a computer readable signal bearing media bearing the program.

22. The program product of claim 20, wherein the signal bearing media is transmission type media.

23. The program product of claim 20, wherein the signal bearing media is recordable media.

* * * * *